Nov. 4, 1952 J. BROIDO 2,616,329
RETRACTABLE VIEW-FINDER FOR MOTION-PICTURE CAMERAS
Original Filed June 26. 1950

INVENTOR:
Jacques BROIDO
by [signature]
Attorney

Patented Nov. 4, 1952

2,616,329

UNITED STATES PATENT OFFICE 2,616,329

RETRACTABLE VIEW-FINDER FOR MOTION-PICTURE CAMERAS

Jacques Broïdo, Carouge-Geneva, Switzerland

Original application June 26, 1950, Serial No. 170,301. Divided and this application July 9, 1951, Serial No. 235,695. In France February 14, 1950

2 Claims. (Cl. 88—1.5)

This application is a divisional application divided out of my co-pending application Ser. No. 170,301 filed on June 26, 1950 for "Motion Picture Cameras."

The present invention refers to motion picture cameras of any size.

The object of the invention is to provide a camera having on the one hand, a very flat shape, practically no obstructing parts, and on the other hand having all its different components arranged in such a way that their handling becomes easier. With this object in view the camera according to the invention is provided with a retractable view-finder comprising two frames, two slots provided on a lateral wall of the camera and wherein the two frames are slidably arranged, springs arranged in said slots to urge said frames outwards in their operating position, elastic locking means to immobilize said frames in their retracted position of rest inside said slots and common control means arranged to simultaneously release the said locking means whereby said frames are pushed outwardly by said springs.

As an example, an embodiment of a camera according to the invention, with all the improvements above mentioned, is described hereafter with reference to the accompanying drawing wherein.

Figure 1:
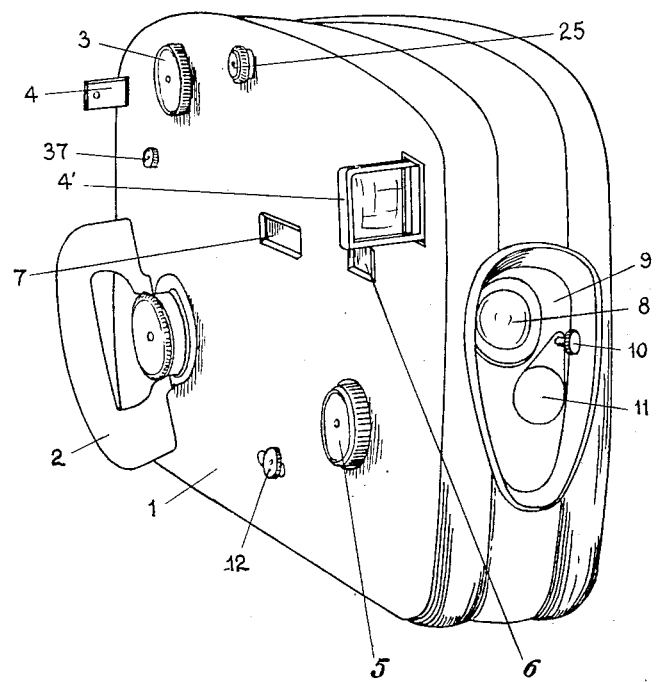
Fig. 1 is a perspective view of the camera.
Figure 2:
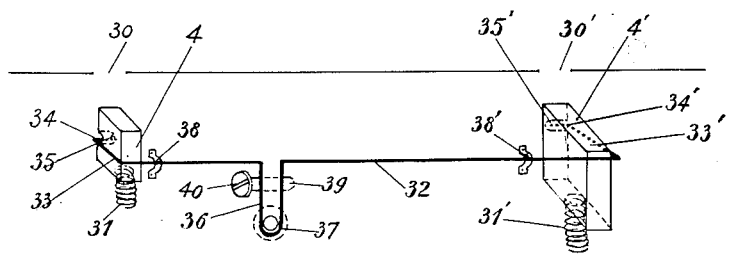
Fig. 2 shows the means controlling the retractable finder.

As shown in Fig. 1, in the flat and oblong camera 1, all the control members are placed on the same side wall, especially the winding up handle 2 of the barrel, the speed control knob 3, the view finder consisting in the frames 4, 4', eventually equipped with suitable lenses, the knob 5 controlling the apertures, the opening 6 in front of which moves the scale of the apertures, the window 7 in front of which is movable the graduation of the film footage indicator, the knob 12 controlling the starting and the stopping. All these elements project very little out of the surface of the camera when not in use, reducing thereby to utmost the bulkiness. For the same purpose, the winding up handle can be folded back and the finder can be folded flat to the camera by means of a device which shall be described hereafter.

The object lens 8 of the camera does not project out of the front side of the camera and is sunk in an oblong recess or socket, which can be closed with a glass. The lens is thereby well sheltered and the bulkiness of the camera is reduced. In addition, a stem or small rod 10, in the recess 9, carries a filter, a lens, a "portrait" lens, or any supplementary lens 11 for the case when the lens is a fixed focussing lens, allowing thereby to place instantly any of these elements in front of the lens 8, without having to take them out of a cover and screw them on the support of the lens. Furthermore, as the lens is inside the recess, a sky hood is no more necessary.

As above indicated, the finder consists of the frames 4, 4' and can be retracted in the camera when not in use. For this purpose, the frames 4, 4' are slidably arranged in slots 30, 30' provided in the lateral wall of the camera and springs 31, 31' are provided in said slots to urge the springs outwards in their operating position. The locking of the finder in its retracted position is performed by means of a metallic resilient string 32, bent at both ends 33, 33' provided with hooks 34, 34' to engage notches 35, 35' provided on the frames 4, 4'. In addition, the string 32 is fixed to the camera in two places 38, 38', and bent twice in 36 in a plane parallel to the wall of the camera, in the shape of a U, preferably at a point out of the middle of the string 32. A spring blade 39, screwed to the camera in 40, biasses the U outwards, whilst a press knob 37 on the camera (Figs. 1 and 4), when pressing on the U-shaped part of the string 32, causes a deflection of the hooked ends 33, 33' of the string 32 allowing the hooks 34, 34' to be released from the notches 35, 35' of the frames 4, 4' which are pushed outwards by the springs 31, 31' to their operating position.

What I claim is:

1. In a motion picture camera, a retractable view finder comprising two frames provided with lenses, two slots provided on a lateral wall of the camera and wherein the two frames are slidably arranged, springs arranged in said slots to urge said frames outwards in their operating position, locking means to immobilize said frames in their retracted position of rest and comprising a flexible metallic member arranged parallel to the lateral wall of the camera and having its ends bent at right angles, a notch provided on one side of each frame, hooks provided on the ends of the metallic flexible member and engaging said notches, a knob provided on the wall of the camera to depress said flexible member whereby its hooked ends are deflected outwardly and the hooks released from the notches, allowing the frames to be pushed outwardly in their operating position by the springs arranged in the slots.

2. In a motion picture camera, a retractable view finder comprising two frames provided with lenses, two slots provided on a lateral wall of the camera and wherein the two frames are slidably arranged, springs arranged in said slots to urge said frames outwards in their operating position, locking means to immobilize said frames in their retracted position of rest and comprising a flexible metallic string arranged parallel to the lateral wall of the camera and having hooked ends bent at right angles, a notch provided on one side of each frame of the finder, and engaging with said hooks in the retracted position of rest, said string being bent to form a U in a point out of its middle, an elastic blade fixed to the inner side of the wall of the camera and pressing said U towards said wall, and a control knob provided on the wall of the camera and engaging said U to depress the flexible string whereby its hooked ends are deflected outwardly and released from the notches allowing the frames to be pushed outwardly in their operating position by the springs arranged in the slots.

JACQUES BROÏDO.

REFERENCES CITED

The following references are of record in the file of this patent:

UNITED STATES PATENTS

| Number | Name | Date |
| --- | --- | --- |
| 1,114,895 | Linder | Oct. 27, 1914 |
| 1,495,357 | Rivetta | May 27, 1924 |

FOREIGN PATENTS

| Number | Country | Date |
| --- | --- | --- |
| 803,034 | France | June 29, 1936 |